Figure 1:
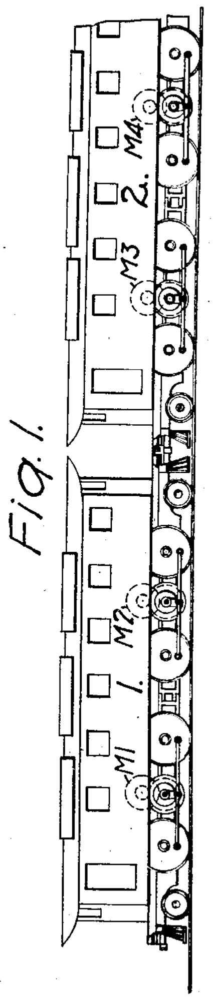

A. J. HALL.

CONTROL SYSTEM.

APPLICATION FILED JAN. 5, 1915.

1,260,666. Patented Mar. 26, 1918.

4 SHEETS—SHEET 1.

WITNESSES:

R J Ridge

D. H. Mace

INVENTOR

Arthur J. Hall.

BY

Wesley G. Carr

ATTORNEY

A. J. HALL.

CONTROL SYSTEM.

APPLICATION FILED JAN. 5, 1915.

1,260,666.

Patented Mar. 26, 1918.

4 SHEETS—SHEET 2.

WITNESSES:

INVENTOR
Arthur J. Hall.
BY
ATTORNEY

A. J. HALL.
CONTROL SYSTEM.
APPLICATION FILED JAN. 5, 1915.

1,260,666.

Patented Mar. 26, 1918.

4 SHEETS—SHEET 3.

WITNESSES:

INVENTOR
*Arthur J. Hall.*
BY
ATTORNEY

A. J. HALL.

CONTROL SYSTEM.

APPLICATION FILED JAN. 5, 1915.

1,260,666.

Patented Mar. 26, 1918.

4 SHEETS—SHEET 4.

WITNESSES:

R. J. Ridge

D. W. Mace

INVENTOR

Arthur J. Hall.

BY

Wesley G. Carr

ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,260,666. Specification of Letters Patent. Patented Mar. 26, 1918.

Application filed January 5, 1915. Serial No. 571.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems, of which the following is a specification.

My invention relates to control systems for dynamo-electric machines, and it has special reference to systems for controlling the operation of a plurality of driving motors that act upon a common load, such as is the case with electric locomotives and other electrically propelled vehicles.

One of the objects of my invention is to provide a multiple-unit control system for governing the operation of the driving motors of an electric locomotive comprising two half units that are operated together, or of an electric locomotive comprising two motor-driven trucks.

Another object of my invention is to provide a simple and reliable system of the character above indicated embodying means for adapting the motor-circuit connections for different ranges of operating speeds in such manner that the transitions in motor-circuit connections of the motors of the several half units or driving trucks are effected successively, whereby a continuous driving effort acts upon the common load even during the period of transition.

A still further object of my invention is to provide a system of the above-mentioned type which not only shall be adapted for the successive transitions of the several sets of driving motors but which shall be so arranged that successive transitions shall not merely be permitted but shall be necessitated.

It is a more specific object of my invention to provide a control system of the character referred to which shall embody suitable interlock switches and an electro-responsive device that coöperate, the one with the other, and function to automatically delay the transition of motor-circuit connections of one set of driving motors after the change-over of the other set thereof, and, moreover, to prevent the transition of the second set of motors until the first set of motors has been changed over and is again acting upon the load.

In my co-pending application, Serial No. 860,607, filed September 8, 1914, I have set forth, in detail, a control system of the general type under consideration, with the exception that, in the system referred to, the transitions of motor circuit connections of the several sets of driving motors are effected concurrently, thereby causing the driving effort of all of the motors to be discontinued during the transition period.

In another co-pending application, Serial No. 861,767, filed by me September 15, 1914, I have set forth a multiple-unit system of control of the above mentioned type by means of which the transitions in motor-circuit connections may be effected successively provided the operator delays the movement of the motor-speed controller in its mid-position between adjacent operating positions a sufficient time to enable the driving motors of one unit to be changed-over.

According to my present invention, I propose to improve the control systems of the prior art and to provide means for accomplishing the objects hereinbefore enumerated and for overcoming the difficulties and objections incident to other control systems that are adapted to effect somewhat similar modes of operation.

Figure 2:
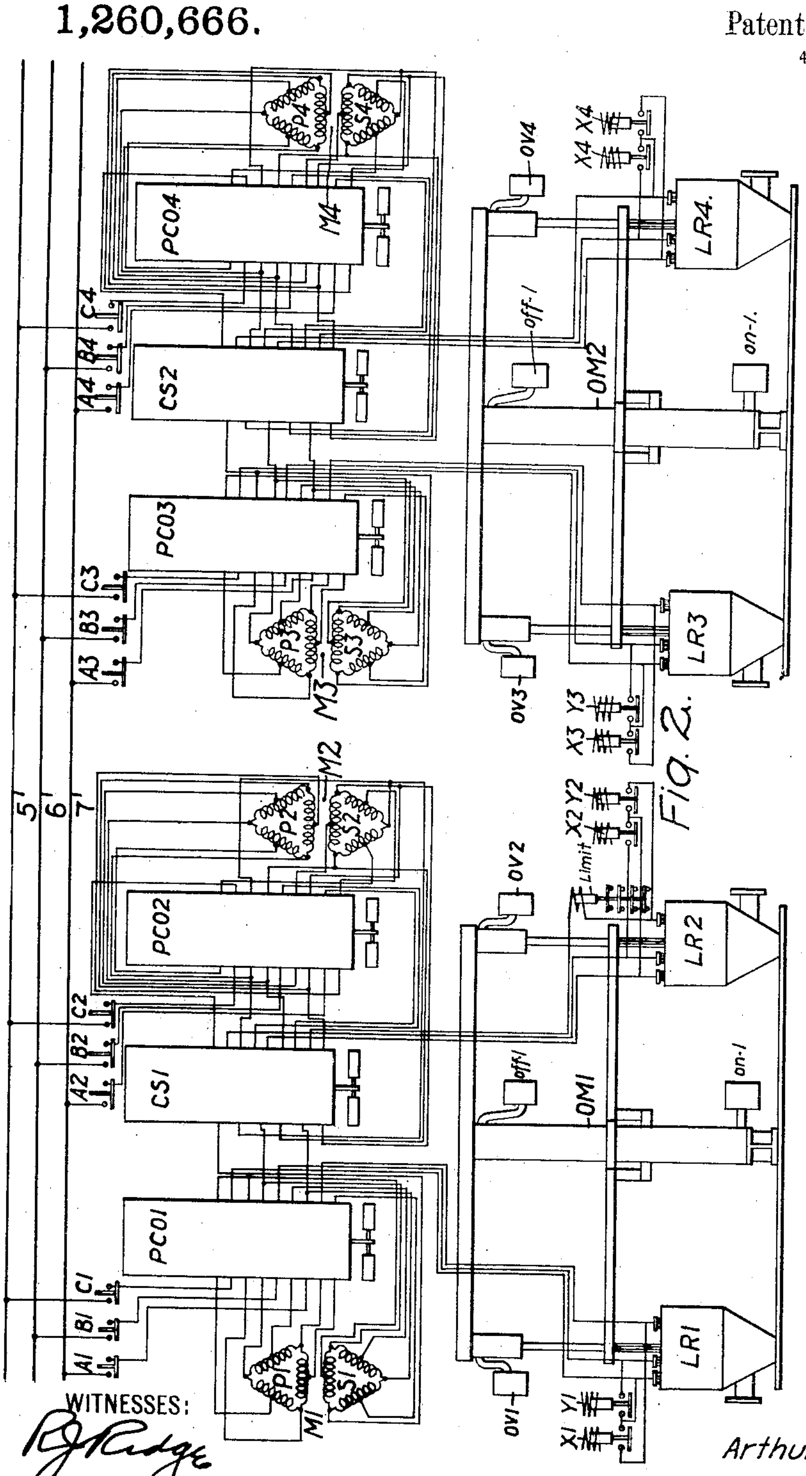
Figure 3:
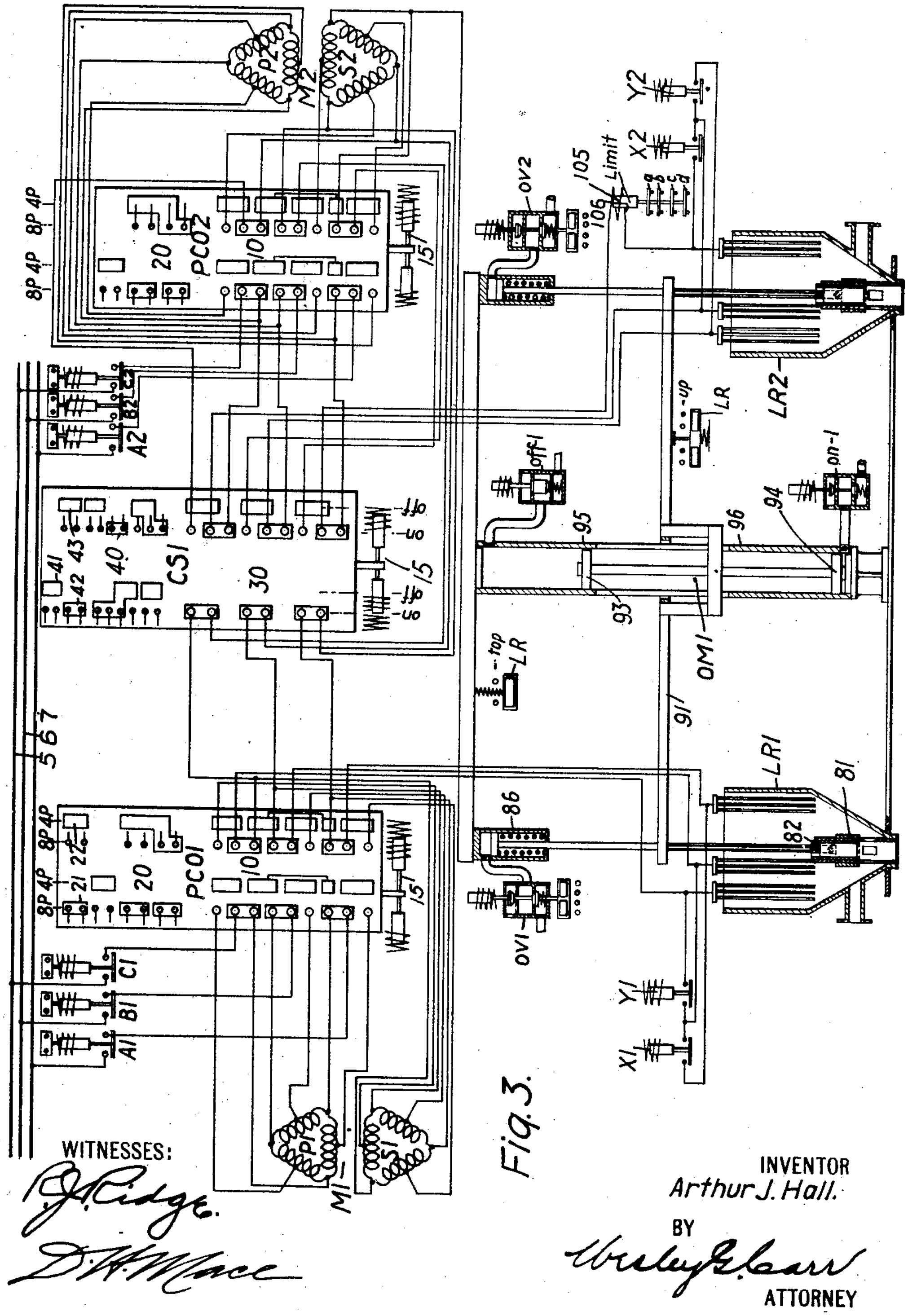
Figures 4, 5, 6, 7:
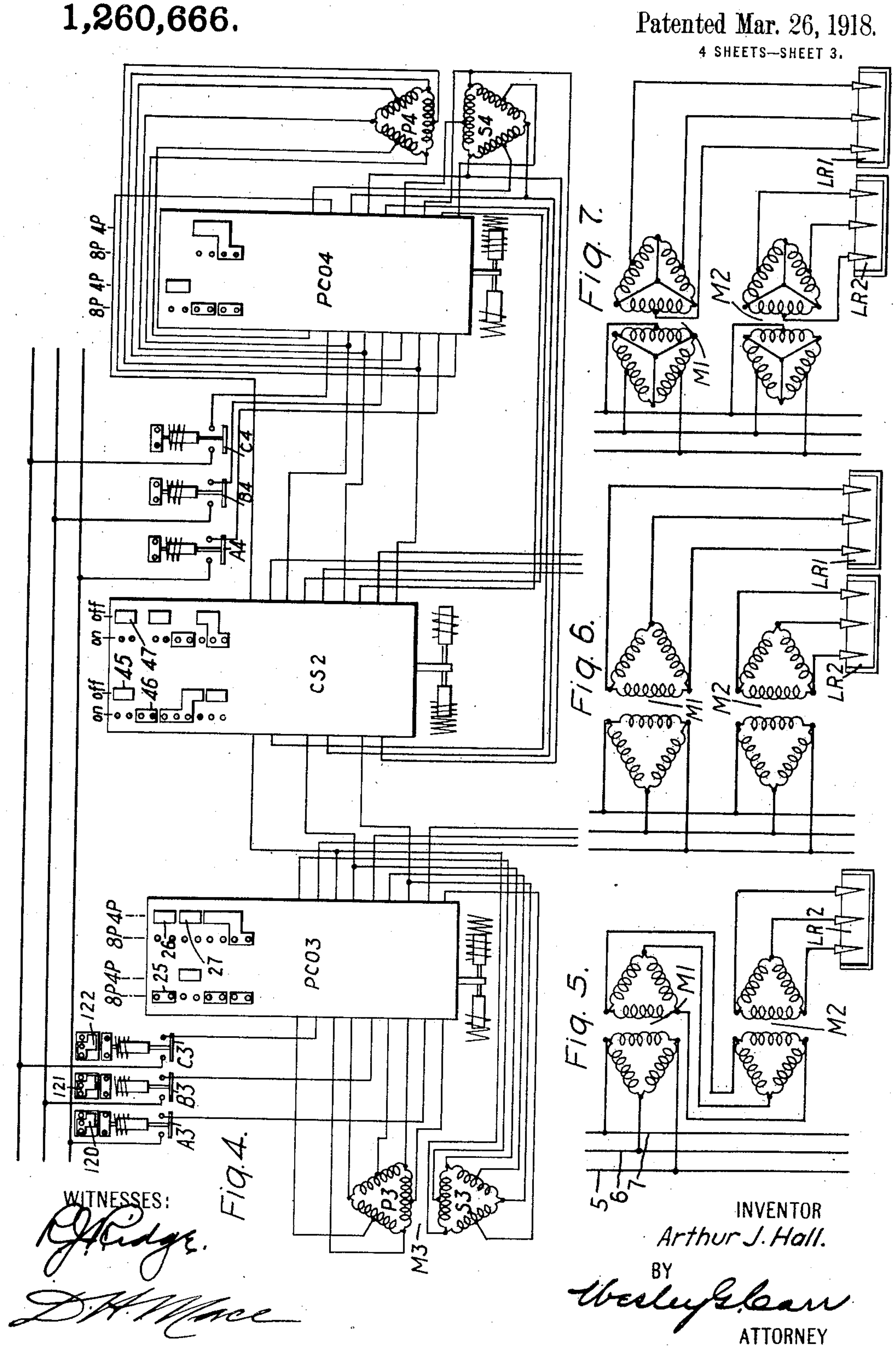
Figure 8:
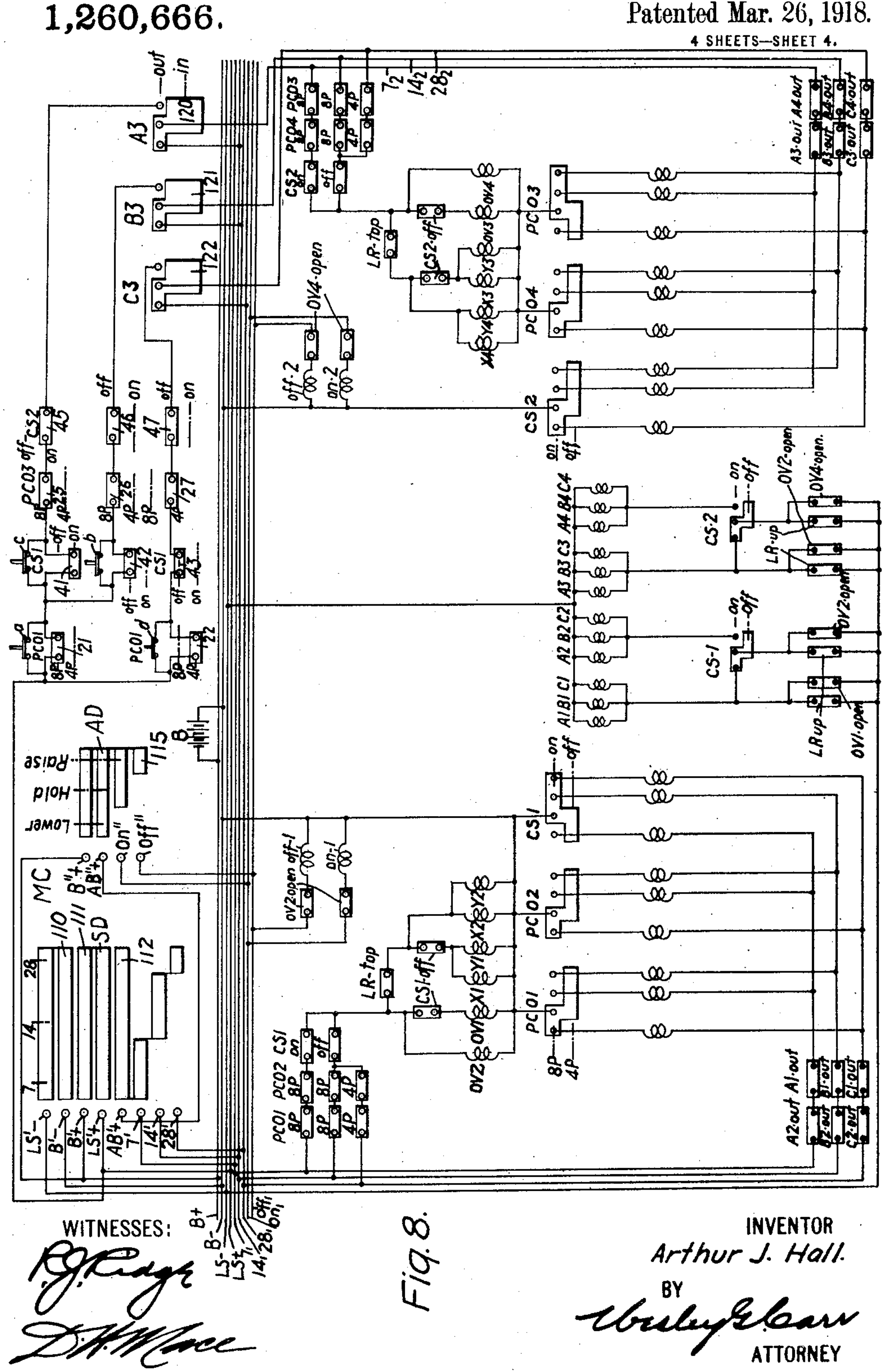

In the accompanying drawings, Figure 1 is a view, in side elevation, of an electric locomotive comprising two half units for the control of which my invention is adapted; Fig. 2 is a diagrammatic view of a system of control embodying my invention, the main circuit connections and apparatus of both locomotive half units being shown; Fig. 3 is a diagrammatic view of the complete main-circuit connections and main control apparatus of a portion of my system of control that is adapted to govern the operation of one of the locomotive half units, the auxiliary control apparatus that is actually associated with and actuated by certain of the control apparatus being shown, while the control circuits thereof are omitted for the sake of clearness; Fig. 4 is a view, similar to Fig. 3, showing a portion of the main-circuit connections and main control apparatus of that part of the system that is associated with, and adapted to govern, the operation of the second locomotive half unit, certain of the auxiliary interlock switches being shown; Figs. 5, 6 and 7 are simplified diagrammatic views showing the arrangement of main motor-circuit connections of the driving motors of one of the locomotive half units for three different speed combinations or ranges of operating speeds, and Fig. 8 is a diagrammatic view of the complete auxiliary control-circuit connections and control apparatus that are employed in governing the operation of the locomotive as a whole, as shown in Fig. 2. For the sake of simplicity, the various interlock switches and energizing coils are distributed throughout the diagram without relation to the main control devices with which they are actually associated and by which their actuation is effected.

The main circuit connections and control apparatus of the two locomotive half units are identical, as shown in Fig. 2, and, in general, the auxiliary interlock switches and other control accessories and connections are similar, except that certain interlock switches, which function only to govern the automatic transition of the motor-circuit connections of the respective locomotive half units are employed. These distinctions will be hereinafter pointed out with particularity.

Inasmuch as my present invention pertains only indirectly to the general arrangement of apparatus, circuit connections and mode of operation of the system, a complete description thereof will not be given, especially since it is clearly set forth in my copending application, Serial No. 860,607, hereinbefore referred to. I shall, therefore, describe the general operation of the system only briefly and shall pay particular attention to that portion of the system which controls, and effects the successive transitions in, motor circuit connections of the driving motors of the respective locomotive half units.

Referring to the drawings, the system shown is adapted for the control of a plurality of locomotive half units 1 and 2 that constitute a single locomotive and are respectively provided with polyphase induction driving motors M1 and M2, and M3 and M4. Obviously, the arrangement of motors with respect to the vehicle is relatively unimportant and my invention is equally applicable to a single locomotive half unit having a plurality of motor-driven trucks.

The system comprises a plurality of supply-circuit conductors 5, 6 and 7 which are adapted to deliver polyphase alternating-current energy to the driving motors M1 and M2, and M3 and M4; a plurality of line swtiches A1, B1, C1 and A2, B2, C2 and A3, B3, C3 and A4, B4 and C4 for respectively connecting the supply conductors 5, 6 and 7 to the motors M1, M2, M3 and M4; a plurality of pole change-over switches PCO1 and PCO2 for arranging the winding connections of the motors M1 and M2 for different numbers of poles; a cascade switch CS1 for connecting the motors M1 and M2 either in cascade relation or in parallel relation; a plurality of pole change-over switches PCO3 and PCO4 for connecting the windings of the motors M3 and M4 for different numbers of poles; a cascade switch CS2 for arranging the motors M3 and M4 for cascade or for parallel operation; a plurality of liquid rheostats LR1, LR2, LR3 and LR4 that are respectively adapted to be connected in the secondary circuits of the motors M1, M2, M3 and M4 for governing the acceleration and regeneration thereof; a plurality of electro-pneumatic operating mechanisms OM1 and OM2 for respectively actuating the pairs of liquid rheostats LR1 and LR2, and LR3 and LR4; a plurality of electrically operated switches X1, Y1 and X2, Y2 and X3, Y3 and X4 and Y4 for respectively establishing short-circuit connections for the several rheostats LR1, LR2, LR3 and LR4, and an electro-responsive relay marked "Limit" associated with one of the motor circuits of the locomotive half unit 1 for automatically governing the transition of motor-circuit connections between the different ranges of operating speeds.

The pole change-over switches PCO1 and PCO2, the cascade switch CS1, the liquid rheostats LR1 and LR2, and the operating mechanism OM1, together with their auxiliary control apparatus and circuit connections, constitute means for governing the operation of the motors M1 and M2 that are associated with the locomotive half unit 1, while similar devices PCO3, PCO4, CS2, LR3, LR4 and OM2 perform like functions in connection with the control of the driving motors M3 and M4 of the second locomotive half unit 2.

The motors M1, M2, M3 and M4 are preferably of the wound rotor polyphase induction type, having primary windings P1, P2, P3 and P4 and secondary windings S1, S2, S3 and S4, respectively. Initially, the windings are connected in delta relation and are adapted for a particular number of poles, for instance, eight poles, while said windings may be reconnected in such manner as to halve the number of poles and thus produce machines of the four-pole type. No description of the means for adapting the motors for different numbers of poles will be given, inasmuch as such means and connections are old and well known in the art.

Referring to Fig. 3, the pole change-over switches PCO1 and PCO2 comprise groups 10 of coöperating stationary and movable main contact members and groups 20 of coöperating stationary and movable auxiliary interlock switch members that are adapted for coöperative engagement on the position-indicating lines 8P and 4P. When the pole change-over switches PCO1 and PCO2 occupy their 8P positions, the windings of the motors M1 and M2 are arranged for eight poles, while, in the 4P positions, the change-over switches adapt the motor windings for four poles. The change-over switches PCO1 and PCO2 are provided with electromagnetic actuating devices 15 by means of which said switches are caused to occupy the one or the other of their operative positions.

The cascade switch CS1 is similar in construction and operation to the pole change-over switches and comprises a group 30 of coöperating main stationary and movable contact members and a group 40 of coöperating relatively movable interlock switch members. The cascade switch CS1 is adapted to occupy two positions On and Off in which its main contact members establish a cascade arrangement of the motors M1 and M2 or connect them in parallel relation. This switch is also provided with an electromagnetic operating device 15.

The pole change-over switches PCO3 and PCO4, and the cascade switch CS2 which are associated with the locomotive half unit 2 are of similar construction to the corresponding switches employed upon the locomotive half unit 1 and function in a similar manner.

By proper manipulation of the pole change-over switches and cascade switches, the several sets of driving motors M1 and M2, and M3 and M4 may be connected, first, in cascade relation with eight poles, as shown in Fig. 5; second, in parallel relation, with eight poles, as shown in Fig. 6; and, third, in parallel relation, with four poles, as shown in Fig. 7, whereby the motors are adapted for different ranges of operating speeds, for instance, from zero to seven miles per hour, from seven to fourteen miles per hour, and from fourteen to twenty-eight miles per hour.

The several groups 20 of auxiliary interlock switches that are associated with the respective pole change-over switches PCO1, PCO2, PCO3 and PCO4 and the groups 40 of auxiliary interlock switches that are associated with the cascade switches CS1 and CS2 embody one set of interlock switches that are employed in the regular operation of the system for the purpose of insuring a predetermined sequence of operation of various control devices and also another set of interlock switches that serve directly to control the automatic successive operations of the apparatus associated with the respective locomotive units during the periods of transition of one speed combination to another. Inasmuch as the function and operation of the first set of interlock switches are fully set forth in my first-mentioned co-pending application, and, since these switches have no material bearing upon my present invention except as they perform necessary functions in an operative system, no detailed reference will be made thereto. The second set of interlock switches, however, is essential to the operation of my present invention and determine and prescribe the operation during successive transitions. These switches, therefore, will be set forth in detail and their various functions fully described.

In order to facilitate the description of the system during transitions, attention is directed to the fact that the pole change-over switch PCO1 is provided with interlock switches 21 and 22, cascade switch CS1 with interlock switches 41, 42 and 43, pole change-over switch PCO3 with interlock switches 25, 26 and 27, and a cascade switch CS2 with interlock switches 45, 46 and 47.

The several liquid rheostats LR1, LR2, LR3 and LR4 are of like and well known construction and are fully described in my co-pending application as embodying discharge valves 81 that are adapted to be opened and closed through the agency of electro-pneumatic devices 86 which are severally controlled by means of electromagnetically operated outlet valves OV1, OV2, OV3 and OV4. The several liquid rheostats are provided also with movable tubular regulating valves 82 that are adapted to be raised and lowered in position for the purpose of fixing the height of the electrolyte which is continuously supplied thereto. The regulating valves 82 are operatively connected to cross arms 91 which are actuated by the electro-pneumatic mechanisms OM1 or OM2.

Each of the operating mechanisms OM1 and OM2 embodies operating cylinders 95 and 96 which contain movable pistons 93 and 94 that are mechanically connected by a piston rod 92 to which the movable cross arm 91 is secured. The upper end of the cylinder 95 is provided with an electromagnetically operated valve "Off—1" for governing the admission and release of operating fluid to and from the cylinder. The lower end of cylinder 96 is provided with an electromagnetically controlled valve "On—1."

Since the construction of the operating mechanism forms no material part of my present invention, except as it performs its necessary functions in the control of the driving motors, and particularly, inasmuch, as its structure and operation are fully set forth in my co-pending application, I shall not encumber this application with further description thereof.

The line switches A3, B3 and C3 are provided with auxiliary interlock switches 120, 121 and 122 for the purpose of governing the successive transitions in motor-circuit connections in addition to other interlock switches that coöperate to effect the desired sequence of operation during the regular operation of the system.

The relay marked "Limit" comprises a movable magnetizable core 105 and a series energizing coil 106 that is connected in series-circuit relation with one of the secondary circuits of the motor M2 and is, therefore, traversed by the motor current. The relay "Limit" also comprises a plurality of movable switch members *a*, *b*, *c* and *d* that are respectively adapted to be raised out of engagement with their stationary contact terminals when the "Limit" is energized a predetermined amount. Although the coil 106 of the "Limit" is shown as associated with the secondary circuit of the motor M2, it should be understood that it is not necessarily restricted to such a location and may be electrically associated with any primary or secondary motor circuit of the locomotive half unit 1.

Reference may now be had to Fig. 8 in which the auxiliary control apparatus and circuit connections are shown for governing the multiple-unit operation of the two locomotive half units 1 and 2.

Among the apparatus shown, is a master controller MC comprising two parts, a speed drum SD and an acceleration drum AD, the speed drum comprising a plurality of stationary contact terminals LS′—, B′—, B′+, LS′+, AB′+, 7′, 14′ and 28′ which are adapted to coöperatively engage a plurality of movable conducting segments 110, 111 and 112 upon the position-indicating lines 7, 14 and 28 which represent the operative positions of the speed drum SD in which the connections of the motors of the several locomotive half units 1 and 2 are arranged for different speed combinations or ranges of operating speeds.

The acceleration drum AD comprises stationary contact terminals B″+, AB″+, On″ and Off″ which coöperate with a movable conducting segment 115 and effect engagement therewith along the position-indicating lines "Lower," "Hold" and "Raise."

In order to provide for multiple unit operation, a plurality of train-line conductors are employed, namely; B+, B—, LS—, LS+, $7_1$, $14_1$, $28_1$, $On_1$ and $Off_1$, these train-line conductors being electrically connected to the stationary contact terminals of the master controller MC bearing the corresponding reference characters.

The acceleration drum AD is adapted to control the operation of the several electro-pneumatically operating mechanisms OM1 and OM2, whereby the several regulating valves 82 of the rheostats LR1, LR2, LR3 and LR4 are simultaneously raised or lowered in position to effect concurrent changes in the levels of the electrolyte in the rheostats and corresponding changes in the acceleration of the several driving motors M1, M2, M3 and M4.

Without attempting a complete description, a brief exposition of the system will now be given, particular attention being given to the novel features of the system which provide for successive automatic transitions in the motor-circuit connections between the several speed combinations.

Assuming the apparatus and circuit connections to be as shown in the drawings, the speed drum SD is first moved into its position 7, while the acceleration drum AD is moved to its "lower" position, whereby energy is supplied to the train line conductor 7, and, therefore, the several outlet valves "OV2" and "OV4" of the respective operating mechanisms OM1 and OM2 are concurrently energized to effect the simultaneous closure of their associated discharge valves 81, provided that the several pole change-over switches and cascade switches occupy their proper positions for establishing the first set of motor connections, as shown in Fig. 5.

The control circuit conductor $7_2$ of the second locomotive half unit 2 is connected to the train line conductor $7_1$ through the interlock switch 120—A3—out, but other than this distinction, the circuit connections and operation of the system with respect to locomotive unit 2 are identical to those of the locomotive 1, as fully set forth in my first mentioned copending application.

Subsequent to the closure of the discharge valves 81 of the several rheostats LR2 and LR4, the several sets of line switches A1, B, C1 and A3, B3 and C3 are closed to connect the motors M1 and M3 to the supply-circuit conductors 5, 6 and 7.

When the line switch A3 is closed, a "holding" circuit is established from contact member LS′+ of the speed drum SD which includes interlock switches 21—PCO1—8P, 41—CS1—on, 25—PCO3—8P, 45—CS2—on, and 120—A3—in, whence the control circuit conductor $7_2$ is directly supplied with energy from a source independent of the train-line conductor $7_1$.

The acceleration drum AD may then be moved to its "raise" position, in which the "off" and "on" magnet valves of the several mechanisms OM1 and OM2 are energized to cause said devices to raise their associated regulating valves 82 into position for effecting the concurrent acceleration of all the driving motors M1, M2, M3 and M4.

When the operating mechanisms OM1 and OM2 have reached their upper limits of travel, the several sets of short-circuit switches X2, Y2 and X4, Y4 are closed.

In order to increase the speed of motor operation, it is necessary to rearrange the motor connections or to effect a transition of connections to establish a new arrangement of motors that is adapted to permit of an increased range of operating speeds. To accomplish this end, acceleration drum AD is moved to its "hold" position and the speed drum SD is moved to its position 14. In so doing, the conducting segment 112 becomes disengaged from contact terminal 7′ and, hence, the train-line conductor $7_1$ is deenergized, whereby the outlet valve OV2 of the rheostat LR2 and its "off" and "on" magnet valves of the operating devices OM1 are deënergized to cause the discharge valve 81 to be opened and the regulating valve 82 of the rheostat LR2 to be lowered to effect a rapid discharge of electrolyte from said rheostat.

It is manifest that similar deënergizations of the magnet valves associated with the apparatus upon the locomotive half unit 2 are not effected, inasmuch as the interlock switch 120—A3—in maintains the "holding" circuit hereinbefore recited, which is independent of the train-line conductor $7_1$.

When the regulating valve 82 of the rheostat LR2 reaches at its lowermost position, line switches A1, B1 and C1 are opened, after which the cascade switch CS1 is actuated into its off position by reason of the cooperative engagement of contact terminals 14′ with the conducting segment 112 of the speed drum SD which energizes train-line conductor 14, and the operating device 15 of said cascade switch.

Subsequently, the outlet valves OV1 and OV2 are energized to effect the closure of the discharge valves 81 of the rheostats LR1 and LR2. The line switches A1, B1, C1 and A2, B2 and C2 are also closed, and the operating mechanism OM1 is operated to raise the level of the electrolyte within the rheostats LR1 and LR2 to establish their respective "flush-levels", whereby the motors M1 and M2 are again started into operation and assume a portion of the load.

In the manner described, the load is removed from the motors M1 and M2, the transition of motor-circuit connections of said motors is effected, and said motors are again accelerated to pick up the load. In so doing, the "Limit" is energized as soon as the motors M1 and M2 again take up the load and serves to disengage its several switch members *a*, *b*, *c* and *d* from their coöperating terminals when the motor current reaches a predetermined value for which the "Limit" is adjusted. The function of the "Limit" will now be set forth.

During the transition of motor-circuit connections of the motors M1 and M2 which is effected by the actuation of the cascade switch CS1 into its off position, its interlock switch 41—CS1—on is opened, and, but for the engagement of the switch member *c* of the "Limit" with its coöperating stationary terminals, said interlock switch would effect the interruption of the "holding" circuit for the conductor $7_2$ of the second locomotive unit 2. However, inasmuch as the actuation of the cascade switch CS1 takes place after the line switches A1, B1 and C1 are opened, no current traverses the energizing coil 106 of the "Limit", and, therefore, the engagement of its switch member C with its coöperating terminals is maintained. Thus, a shunt circuit across the interlock switch 41—CS1—on is established by switch member C which prevents the interruption of the "holding" circuit referred to.

However, subsequent to the transition of the motors M1 and M2 and the resumption of load by said motors, the "Limit" again becomes energized and, when the current exceeds a predetermined amount for which it is set, said "Limit" effects the disengagement of its respective coöperating switch members. Thus, the switch member C is raised to interrupt the "holding" circuit for the conductor $7_2$ of the second locomotive unit 2, whereupon the control apparatus of said unit is caused to be actuated in a manner similar to the corresponding control devices of locomotive unit 1. Therefore, the outlet valve OV4 and the "off" and "on" magnet valves of the operating mechanism OM2 are deënergized, thereby causing actuation of the discharge valve 81 and the regulating valve 82 of the rheostat LR4 to permit of the discharge of electrolyte from the rheostat.

As soon as the regulating valve 82 of the rheostat LR4 reaches its lowest position, the line switches A3, B3 and C3 are opened. As the line switch B3 drops into its out position, a circuit is established from contact terminal 14′ of the speed drum SD, which includes train-line conductor $14_1$ and interlock switch 121—B3—out, whence the control-circuit conductor $14_2$ of the locomotive unit 2 is energized. Thereupon, the cascade switch CS2 is actuated to its off position, and, subsequently, the outlet valves OV3 and OV4 are energized and cause to effect the closure of the discharge valves 81 of the rheostats LR3 and LR4. The line switches A3, B3, C3 and A4, B4 and C4 are then energized and closed. Having closed the line switches, the inflowing electrolyte, rising to establish "flush levels" in the rheostats LR3 and LR4, causes the motors M3 and M4 to be again accelerated and to take up a portion of the load.

The closure of the line switch B3 establishes a "holding" circuit for the control circuit conductor $14_2$ of the second locomotive half unit 2 from contact terminal LS'+ which includes interlock switches 21—PCO1—8P, 42—CS1—off, 26, PCO3—8P, 46—CS2—off and 121—B3—in.

It is evident, therefore, that, by reason of the action of the "Limit", the transition of motor-circuit connection of the motors M3 and M4 is not only delayed until the speed-changing switches of the locomotive half unit 1 have been actuated, but the change-over of circuit connections of the motors of the locomotive half unit 2 is prevented until the transition of the motors M1 and M2 have been accomplished and, moreover, until said motors are again acting upon the load. In this manner, a continuous driving effort is maintained upon the locomotive during the periods of transition in motor-circuit connections.

While the use of a current limit relay, such as described, insures the operation set forth, it is probable that the discharge of electrolyte from the rheostats of the first locomotive half unit will provide a sufficient time interval to delay the transition of the motors M3 and M4 and to permit the reconnected motors M1 and M2 to again assume the load before the motors M3 and M4 are changed over.

The speed of operation of the driving motors may be increased by suitable manipulation of the accelerating drum AD, whereby the several operating mechanisms OM1 and OM2 are caused to effect the elimination of resistance from the motor secondary circuits by reason of the concurrent filling of the several rheostats LR1, LR2, LR3 and LR4, after which the short-circuit switches are closed.

Further increases in speed may be effected only by first changing the motor-circuit connections to those shown in Fig. 7, whereby the system is arranged for the last range of operating speed.

This operation is effected by first moving the controller AD to its "hold" position and then moving the controller SD into its position 28, whereby the conducting segment 112 becomes disengaged from the contact terminal 14' which effects the deënergization of the outlet valves OV1 and OV2 and the "off" and "on" magnet valves of the operating mechanism OM1. The discharge valves 81 of the rheostats LR1 and LR2 are thus raised, and the regulating valves 82 thereof are lowered to their initial positions, whereby a rapid discharge of electrolyte from the liquid rheostats is permitted.

As soon as the operating mechanism OM1 reaches its lowest position, the line switches A1, B1, C1 and A2, B2 and C2 are opened, and, since the speed drum SD then occupies its 28 position and the contact terminal 28' and train line conductor $28_1$ are energized, energy is supplied to the electro-magnetic operating devices 15 of the pole change-over switches PCO1 and PCO2 and said switches are, therefore, actuated into their 4P positions. Immediately following this operation, the outlet valves OV1 and OV2 are again energized, and the closure of the discharge valves 81 of the rheostats LR1 and LR2 and the closure of the line switches A1, B1, C1 and A2, B2 and C2 are successively effected. The operating mechanism OM1 then raises the regulating valves 82 of the associated rheostats to their "flush-level" positions, whereby the electrolyte is raised to a corresponding level and the motors M1 and M2 are again started into operation to act upon the load.

By reason of the "holding" circuit which has been recited for supplying energy to the control-circuit conductor $14_2$ of the second locomotive half unit 2, no changes of the control-circuit connections of the motors M3 and M4 are effected during the transition of the motors M1 and M2 of the first half unit 1 from the second to the third speed combination.

The movement of the pole change-over switches PCO1 and PCO2 into their 4P positions causes the interlock switch 21—PCO1—8P to be operated, but, inasmuch as the motors M1 and M2 are, at this time, disconnected from the supply-circuit conductors 5, 6 and 7, no current traverses the "Limit" and, therefore, the switch member thereof engages its coöperative stationary terminals and maintains the "holding" circuit complete.

However, when the transition of motors M1 and M2 has been effected and a predetermined motor current transverses the "Limit", said device is raised to interrupt the "holding" circuit. Thus, the control circuit conductor $14_2$ of the second half unit 2 is deënergized, whereupon the control apparatus of said unit is actuated in a manner similar to that of the corresponding control devices of the locomotive unit 1, as has just been described.

The outlet valves OV3 and OV4 and the "off" and "on" magnet valves are deënergized, whereupon the discharge valves 81 and regulating valves 82 of the rheostats LR3 and LR4 are actuated to permit the discharge of electrolyte therefrom. The line switches A3, B3, C3 and A4, B4 and C4 are opened when the operating mechanism OM2 reaches its lowest position, and, the opening of the line switch C3 causes its interlock switch 122—C3—out to complete a circuit from the train line conductor $28_1$ which supplies energy to the control-circuit conductor $28_2$ of the second locomotive half unit 2.

The pole change-over switches PCO3 and PCO4 are then moved into their 4P positions by reason of the energization of the electro-magnetic operating devices 15 and, thereafter, the outlet valves OV3 and OV4 are energized to effect the closure of the discharge valves 81 of the respective rheostats. The "off" and "on" magnet valves of the operating mechanism OM2 are then energized and the regulating valves 82 of the rheostats LR3 and LR4 are raised to their "flush-level" positions, during which operation the several sets of line switches are closed. In this manner, the motors M3 and M4 again become active in carrying the load but the transition of their circuit connections is not accomplished until the motors M1 and M2 are changed over and begin to work upon the load, as determined by the operation of the "Limit".

It will be understood that, as the line switch C3 is closed, a "holding" circuit for the control circuit conductor $28_2$ of the second locomotive half unit 2 is established from the contact terminal LS'+. of the speed drum SD through the interlock switches 22—PCO1—4P, 43—CS1—off, 27—PCO3—4P, 47—CS2—off and 123—C3—in.

Having effected the transition of the driving motors of both locomotive half units and initiated their acceleration at the "flush levels", the speed of operation may be increased as desired by suitable manipulation of the acceleration drum AD, as will be understood.

This system of control is particularly adapted for the utilization of the driving motors M1, M2, M3 and M4 as generators, being driven by the inertia of the vehicle or locomotive, for the regeneration of energy for the source, whereby the locomotive is braked dynamically. The regenerative action of the motors may be effected at any time when the speed thereof is greater than the normal synchronous speed of the motors corresponding to the particular arrangement of motors and circuit connections established.

If, therefore, the motors are running at a speed within the last range of operating speeds, and it is desired to retard the locomotive by regenerative braking, the accelerating drum AD may be moved to its "Hold" position, after which the speed drum SD is moved to its second position 14. This operation serves to discontinue the operation of the motors M1 and M2 of the first locomotive unit 1 to rearrange their circuit connections for the second range of operating speeds, and to cause said motors to resume their driving effort upon the load, after which a similar cycle of operation is accomplished with respect to the motors M3 and M4 of the second locomotive half unit 2.

It is not deemed necessary to trace the circuit connections and describe the operation of the successive transitions during regeneration on account of their similarity to those already set forth in detail. During the transition in motor connections from position 28 to position 14, the "holding" circuit of the control circuit conductor $28_2$ of the second locomotive unit 2 is maintained through switch member *d* of the "Limit" until predetermined motor circuit conditions are established.

The regenerative action may be continued by suitable movements of the acceleration drum AD until the speed has been reduced to substantially fourteen miles per hour, after which, further regeneration may be accomplished only by establishing the motor-circuit connections for the lowest range of operating speeds by moving the speed drum SD to its position 7. During this transition, the switch member *b* of the "Limit" performs the function of delaying the change-over of the motors M3 and M4 until the motors M1 and M2 resume their action upon the load.

While my invention is illustrated and set forth as embodying specific arrangements and location of control-circuit apparatus and circuit connections and mode of operation, my invention obviously is not so restricted, and many modifications thereof may be effected without departing from the spirit and scope of my invention and such modifications are intended to be covered by the appended claims.

I claim as my invention:

1. In a system of control, the combination with a source of energy, a plurality of driving motors connected thereto, and means for arranging the connections of said motors for different ranges of operating speeds, of means for successively effecting automatic transitions of said motors.

2. In a system of control, the combination with a source of energy, a plurality of driving motors connected thereto, and means for effecting changes in the motor connections whereby a plurality of ranges of operating speeds are secured, of means for automatically effecting the transition of motor connections of certain motors prior to the transition of connections of the remaining motors.

3. In a system of control, the combination with a source of energy, a plurality of driving motors connected thereto, and means for arranging the connections of said motors for different ranges of operating speeds, of automatic means for delaying the transition of motor-circuit connections of certain motors with respect to the transition of connections of the other motors whereby a portion of the motors carry the load during the transition from one speed connection to another.

4. In a control system, the combination with a source of energy, two sets of polyphase induction motors adapted to drive a common load and receiving energy from said source, and switching means for arranging the motors of each set for different ranges of operating speeds, of means for necessitating successive transitions in the motor connections of the several sets of motors.

5. In a control system, the combination with a source of energy, two sets of polyphase induction motors adapted to drive a common load and receiving energy from said source, and switching means for arranging the motors of each set for cascade and parallel operation, whereby different ranges of operating speeds are obtained, of means for automatically delaying the transition of connections of one set of driving motors with respect to the other, whereby the load is carried by a portion of the driving motors during the transitions.

6. In a control system, the combination with a source of energy, two sets of polyphase induction motors adapted to drive a common load and receiving energy from said source, means for changing the motor connections of each set to effect different ranges of operating speeds, and means for governing the acceleration of the motors for each speed range, of means for automatically causing the connections of one set of motors to be changed prior to those of the other set, whereby a continuous driving effort upon the load is maintained.

7. In a system of control, the combination with a source of energy, two sets of polyphase induction motors adapted to drive a common load and receiving energy from said source, of means for connecting each set of motors for cascade operation with one number of poles, for parallel operation with the same number of poles and for parallel operation with a different number of poles, and means for necessitating the transition of motor connections of one set of motors prior to the transition of motor connections of the other set of motors, whereby a continuous driving effort is applied to the load.

8. In a system of control, the combination with a source of energy, two sets of polyphase induction motors adapted to drive a common load and receiving energy from said source, and switching devices for arranging the motor connections of each set of motors for several speeds of operation, of controllable electrical means for controlling the operation of said switching devices and for effecting the transitions of motor-circuit connections, and auxiliary means associated with said controllable means for delaying the operation of a portion of said switching devices whereby the transitions of the motor-circuit connections of the respective sets of motors are effected successively.

9. In a system of control, the combination with a source of energy, two sets of polyphase induction motors adapted to drive a common load and receiving energy from said source, and means for arranging the connections of each set of motors for several speeds of operation, of electrical means for controlling the operation of said speed-changing means and comprising a master controller adapted to effect concurrent operations of said means whereby the transitions of motor circuit connections of both sets of motors are effected, and automatic means cooperating with said electrical means for delaying the transition of connections of one set of motors until the transition of connections of the other set of motors is accomplished.

10. In a system of control for an electric vehicle having a pair of driving units, the combination with a plurality of motors for each unit, and means for arranging the motor connections for several operating speeds, of means for necessitating successive transitions of the motors of the several driving units.

11. In a system of control for an electric vehicle having a pair of driving units, the combination with a pair of polyphase driving motors for each unit, and means for changing the number of poles of said motors to obtain a plurality of ranges of operating speeds, of means for causing said pole-changing means to effect the change-over of motor connections of the respective units, and means for insuring successive transitions of motor connections of the several driving units.

12. In a system of control for an electric vehicle having a pair of driving units, the combination with a plurality of driving motors for each unit, separate means associated with each set of motors for changing the motor connections for different ranges of operating speeds, and separate means associated with each set of motors for governing the acceleration thereof for each range of speed, of remote-control means for effecting concurrent operations of both of said acceleration-governing means and for automatically effecting successive operations of both of said speed-changing means.

13. In a control system, the combination with a source of energy, a plurality of sets of driving motors adapted to act upon a common load, and switching devices for arranging the circuit connections of the motors of each set for adapting said motors for different ranges of operating speeds, of remote-control electrical means for governing the actuation of said respective switching devices, whereby the transitions of connections are effected, and interlocking means associated with certain of said switching devices for delaying the actuation of other switching devices until the first switching devices have been actuated.

14. In a control system for electric vehicles, the combination with a source of energy, a plurality of sets of driving motors for acting upon a common load, separate line switches for connecting said sets of motors to said source, and a plurality of switching devices associated with each set of motors for arranging the motor-circuit connections for different ranges of operating speed, of electrical means for remotely controlling the operation of said line switches and said switching devices whereby the transitions in motor circuit connections are effected, and auxiliary interlocking means associated with the line switches of one set of motors and the switching devices of the other set of motors for precluding the transition of motor-circuit connections of one set of motors until the transition of the other set of motors is effected.

15. In a control system for electric vehicles, the combination with a source of energy, a plurality of sets of driving motors for acting upon a common load, separate line switches for connecting said sets of motors to said source, and separate speed-changing switches for arranging the motor-circuit connections of each set of motors for different ranges of operating speed, of remote-control electrical means embodying a master controller for effecting concurrent actuations of said switching devices during the transitions of motor-circuit connections, and automatic means associated with the switching devices of one set of motors and the line switches of the other set of motors for delaying the actuation of said last set of switching devices until after the actuation of the first set of switching devices.

16. In a control system for electric vehicles, the combination with a source of energy, a plurality of sets of driving motors for acting upon a common load, separate line switches for connecting said sets of motors to said source, a plurality of switching devices associated with each set of motors for arranging the motor-circuit connections for different ranges of operating speed, and a plurality of rheostatic devices for governing the acceleration of each set of motors, of remote-control means for concurrently controlling the operation of said rheostatic devices, other remote-control means for governing the actuation of said switching devices to effect the motor-circuit transitions, means for necessitating a successive transition of the motor-circuit connections of the several sets of driving motors, and means for precluding the transition of the second set of motors until the transition of the first set of motors has been effected and predetermined motor circuit conditions established.

17. In a control system for electric vehicles, the combination with a source of energy, a plurality of sets of driving motors for acting upon a common load, separate line switches for connecting said sets of motors to said source, a plurality of switching devices associated with each set of motors for arranging the motor-circuit connections thereof for different ranges of operating speed, and a plurality of rheostatic devices for governing the acceleration of each set of motors, of remote-control means for concurrently controlling the operation of said rheostatic devices, other remote-control means for governing the actuation of said switching devices to effect the motor-circuit transitions, and means for preventing the actuation of the switching devices of the second set of motors during the transition of motor-circuit connections until the switching devices of the first set of motors have been actuated and predetermined motor-circuit conditions established.

18. In a control system for electric vehicles, the combination with a source of energy, a plurality of sets of driving motors for acting upon a common load, separate line switches for connecting said sets of motors to said source, a plurality of switching devices associated with each set of motors for arranging the motor-circuit connections for different ranges of operating speed, and a plurality of rheostatic devices for governing the acceleration of each set of motors, of remote-control means for concurrently controlling the operation of said rheostatic devices, other remote-control means for governing the actuation of said switching devices to effect the motor-circuit transitions, auxiliary interlocking means associated with one set of switching devices for necessitating successive operations of the switching devices of the several sets, and electro-responsive means associated with the first set of motors for permitting the actuation of the second set of switching devices only under predetermined circuit conditions.

19. In a system of control, the combination with a source of energy and a plurality of motor-driven units acting upon a common load and adapted to be connected for different speed combinations, of means for effecting successive transitions in the motor-circuit connections in the several driving units, and means for preventing the transition of connections of the second unit until the transition of connections of the first unit are made and predetermined circuit conditions established.

20. In a control system for electrically propelled vehicles, the combination with a plurality of sets of driving motors, severally adapted to be connected for different operating speed ranges and for acting upon a common load, of means for effecting successive transitions of the connections of the several sets of motors and for maintaining a constant driving effort upon the load during the transitions of the several motors.

In testimony whereof, I have hereunto subscribed my name this 30th day of Dec., 1914.

ARTHUR J. HALL.

Witnesses:
O. A. COLBY,
B. B. HINES.

Copies of this patent may be obtained for five cents each, by addressing the "Commissioner of Patents. Washington, D. C."